(12) United States Patent
Wang et al.

(10) Patent No.: US 11,481,894 B1
(45) Date of Patent: Oct. 25, 2022

(54) METHOD, APPARATUS AND SYSTEM FOR CALCULATING STRESS PARAMETERS AND COMPUTER DEVICE

(71) Applicant: China University of Petroleum-Beijing, Beijing (CN)

(72) Inventors: Linlin Wang, Beijing (CN); Zhilei Luo, Beijing (CN); Kaikai Jia, Beijing (CN); Yanchang Deng, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 0 days.

(21) Appl. No.: 17/584,275

(22) Filed: Jan. 25, 2022

(30) Foreign Application Priority Data

Jul. 16, 2021 (CN) .......................... 202110806664.7

(51) Int. Cl.
*G06K 9/00* (2022.01)
*G06T 7/00* (2017.01)
(Continued)

(52) U.S. Cl.
CPC .............. *G06T 7/001* (2013.01); *G01B 11/16* (2013.01); *G01B 15/06* (2013.01);
(Continued)

(58) Field of Classification Search
CPC .. G06V 10/74; G06V 10/751; G06V 10/7515; G06V 10/754; G06V 10/757;
(Continued)

(56) References Cited

U.S. PATENT DOCUMENTS

| 9,652,696 B2 * | 5/2017 | Won ........................ G06V 10/10 |
| 10,288,540 B1 * | 5/2019 | Hay ......................... G01N 3/40 |

(Continued)

FOREIGN PATENT DOCUMENTS

CN 108507476 9/2018

OTHER PUBLICATIONS

Zhilei Luo, Xu Hu, Linlin Wang, Yangxiao Lu, "Measurement of large, discontinuous displacement from digital images", Wiley, Strain, vol. 56, Issue 4, 2020, pp. 1-19 (Year: 2020).*

(Continued)

*Primary Examiner* — Eric Rush
(74) *Attorney, Agent, or Firm* — Loza & Loza, LLP; Michael F. Fedrick (57) ABSTRACT

A method, apparatus and system for calculating stress parameters is provided. The method comprises establishing a first image pyramid according to an image of a sample before deformation, and establishing a second image pyramid corresponding to the first image pyramid according to an image of the sample after deformation; starting from a top level in the first image pyramid, iteratively calculating displacement information on each level in the first image pyramid relative to a corresponding level in the second image pyramid based on a center point of each sub-region at each level in the first image pyramid and other positions in the sub-region; calculating strain information on the sample according to displacement information on a bottom level of the first image pyramid; and calculating stress parameters of the sample based on the strain information.

9 Claims, 4 Drawing Sheets

- establishing a first image pyramid according to an image of a sample before deformation, and establishing a second image pyramid corresponding to the first image pyramid according to an image of the sample after deformation — S110

- starting from a top level in the first image pyramid, iteratively calculating displacement information on each level in the first image pyramid relative to a corresponding level in the second image pyramid based on a center point of each sub-region at each level in the first image pyramid and other positions in the sub-region — S120

- calculating strain information on the sample according to displacement information on a bottom level of the first image pyramid — S130

- calculating stress parameters of the sample based on the strain information — S140

(51) Int. Cl.
*G06T 7/70* (2017.01)
*G06V 10/74* (2022.01)
*G06V 10/75* (2022.01)
*G01M 11/08* (2006.01)
*G01B 11/16* (2006.01)
*G01B 15/06* (2006.01)

(52) U.S. Cl.
CPC ............ *G01M 11/081* (2013.01); *G06T 7/70* (2017.01); *G06V 10/74* (2022.01); *G06V 10/754* (2022.01); *G01N 2203/0075* (2013.01); *G01N 2203/0647* (2013.01); *G06T 2207/20016* (2013.01); *G06T 2207/20021* (2013.01)

(58) Field of Classification Search
CPC ....... G06V 10/759; G06T 3/0006; G06T 3/40; G06T 3/4023; G06T 7/0002; G06T 7/0004; G06T 7/001; G06T 7/33; G06T 7/70; G06T 2207/20016; G06T 2207/20021; G06T 2207/30108; G06T 2207/30132; G06T 2207/30136; G06T 2207/30164; G01B 11/002; G01B 11/16; G01B 15/06; G01N 2203/0075; G01N 2203/0647; G01N 2203/607; G01M 5/0041; G01M 5/005; G01M 11/081; G01L 1/00; G01L 1/24
USPC ................ 382/100, 103, 109, 111, 141–143, 382/145–152, 201, 240, 265, 276, 278, 382/288, 289, 291, 293, 294, 298, 299; 356/32, 33, 35, 35.5, 911, 928, 954; 702/33–35, 41–43, 81–84; 73/760, 783, 73/786, 788, 789, 800
See application file for complete search history.

(56) References Cited

U.S. PATENT DOCUMENTS

| | | | |
|---|---|---|---|
| 2007/0083113 A1* | 4/2007 | Varghese | G06T 7/33 600/437 |
| 2010/0158392 A1* | 6/2010 | Adams | G01N 23/203 382/218 |
| 2014/0160279 A1* | 6/2014 | Grossnickle | G06T 7/32 348/137 |
| 2016/0035104 A1* | 2/2016 | Bigioi | G06T 7/223 348/208.1 |
| 2018/0150962 A1* | 5/2018 | Fletcher | G06T 7/35 |
| 2021/0003389 A1* | 1/2021 | Hild | G06T 7/001 |

OTHER PUBLICATIONS

C. Zhu, H. Wang, K. Kaufmann, K.S. Vecchio, "Computer Vision Approach to Study Surface Deformations of Materials", Measurement Science and Technology, vol. 31, No. 5, Feb. 2020, pp. 1-16 (Year: 2020).*

Chaoyi Zhu, Kevin Kaufmann, Kenneth S. Vechhio, "Novel remapping approach for HR-EBSD based on demons registration", Elsevier, Ultramicroscopy, vol. 208, Jan. 2020, pp. 1-11 (Year: 2020).*

Lin-Lin Wang, Chao-Sheng Tang, Bin Shi, Yu-Jun Cui, Guang-Qing Zhang, Inyang Hilary, "Nucleation and propagation mechanisms of soil desiccation cracks", Elsevier, Engineering Geology, vol. 238, May 2018, pp. 27-35 (Year: 2018).*

Zhilei Luo, Xu Hu, Linlin Wang, Yangxiao Lu, "Measurement of large, discontinuous displacement from digital images," Strain, 2020, 56(4):e12349 (19 pages).

* cited by examiner

METHOD, APPARATUS AND SYSTEM FOR CALCULATING STRESS PARAMETERS AND COMPUTER DEVICE

CROSS-REFERENCE TO RELATED APPLICATIONS

This application claims priority under 35 U.S.C. § 119 to Chinese Patent Application No. 202110806664.7, filed on Jul. 16, 2021, the contents of which are hereby incorporated by reference in their entirety.

TECHNICAL FIELD

The present disclosure relates to the technical field of material stress, in particular to a method, apparatus and system for calculating stress parameters and to a computer device therefore.

BACKGROUND

There are mainly two existing methods for measuring material mechanical parameters. The first method uses strain gauges for measurement, i.e., the strain gauges are bonded on a surface of an object to be measured and the strain gauges are connected to an external circuit; when a load is applied to the surface of the object to be measured, the measured object is mechanically deformed, and the strain gauges thereon are also deformed. Variations of the strain gauges can be presented in a current or voltage of the external circuit, so that a strain value of the measured object at the location of the strain gauges can be obtained by calculating the variations in the voltage or current, and then mechanical parameters of the measured object can be calculated according to a mechanical equation. Disadvantages of this method lie in that, first of all, selection of an appropriate bonding position is required since the strain gauges need to be bonded; in order to avoid external influences, the strain gauges should be tightly bonded to the object to be measured; apart from this, in order to guarantee the experimental accuracy, multiple sets of strain gauges may be required, therefore preparatory works are cumbersome and time-consuming. Secondly, strain gauges can only be used to measure average strain information on the object to be measured within a coverage of the strain gauges, and cannot measure a strain distribution throughout the object to be measured. Thirdly, the current or voltage signal acquired by the strain gauge measurement method requires extremely complicated calculations for obtaining the required mechanical parameters.

The other method applies loads to the object to be measured continuously until the object to be measured is damaged, and obtains mechanical parameters such as a critical failure pressure of the object to be measured according to a value of a maximum load. This method has advantages of simple operations and intuitive results, but also has obvious defects: the mechanical parameters of the object to be measured cannot be repeatedly measured; and parameters, such as strain, displacement or the like, of the object to be measured cannot be reflected in real time in the loading process.

In view of the above-mentioned defects in the prior art, the present disclosure is intended to provide a method, apparatus and system for calculating material stress parameters and a computer device that can guarantee the calculation accuracy and the calculation processing efficiency.

SUMMARY

In view of the above-mentioned problems in the prior art, the present disclosure aims to provide a method, apparatus and system for calculating stress parameters and a computer device to solve the problems that accuracy and efficiency cannot be balanced for the calculation of material stress parameters in the prior art.

In order to solve the technical problem, specific technical solutions of the present disclosure are provided.

In a first aspect, the present disclosure provides a method for calculating stress parameters, comprising the steps of:

establishing a first image pyramid according to an image of a sample before deformation, and establishing a second image pyramid corresponding to the first image pyramid according to an image of the sample after deformation;

starting from a top level in the first image pyramid, iteratively calculating displacement information on each level in the first image pyramid relative to a corresponding level in the second image pyramid based on a center point of each sub-region at each level in the first image pyramid and other positions in the sub-region;

calculating strain information on the sample according to displacement information on a bottom level of the first image pyramid; and calculating stress parameters of the sample based on the strain information.

Further, prior to the step of starting from a top level in the first image pyramid, iteratively calculating displacement information on each level in the first image pyramid relative to a corresponding level in the second image pyramid based on a center point of each sub-region at each level in the first image pyramid and other positions in the sub-region, the method comprises the steps of:

dividing each level in the first image pyramid into sub-regions, the top level in the first image pyramid being one sub-region, and a number of sub-regions corresponding to each level increasing according to a hierarchical relationship.

Specifically, the step of iteratively calculating displacement information on each level in the first image pyramid relative to a corresponding level in the second image pyramid based on a center point of each sub-region at each level in the first image pyramid and other positions in the sub-region comprises the steps of:

acquiring an initial displacement value of the center point of each sub-region at each level in the first image pyramid;

performing a matching calculation with the corresponding level in the second image pyramid based on an inverse Gauss-Newton iteration method according to the initial displacement value to obtain a final displacement value of the center point of each sub-region at each level in the first image pyramid; and performing densification processing based on the final displacement value and other positions in the corresponding sub-region to obtain the displacement information on each level in the first image pyramid relative to the corresponding level in the second image pyramid.

Further, the step of acquiring an initial displacement value of the center point of each sub-region at each level in the first image pyramid further comprises the steps of:

presetting displacement information on the sub-region at the top level in the first image pyramid; and calculating an initial displacement value of a center point of each sub-region at a next level in the first image pyramid based on the hierarchical relationship, according to the displacement information on a last level in the first image pyramid.

Preferably, prior to the step of performing densification processing based on the final displacement value and other positions in the corresponding sub-region to obtain displacement information on each level in the first image pyramid, the method further comprises the steps of:

calculating an Euclidean norm of the initial displacement value and the final displacement value;

comparing the Euclidean norm with a size parameter of the sub-region; and performing densification processing based on the final displacement value and other positions in the corresponding sub-region when the Euclidean norm is greater than the size parameter of the sub-region.

Further, the step of performing densification processing based on the final displacement value and other positions in the corresponding sub-region when the Euclidean norm is greater than the size parameter of the sub-region, the method further comprises the step of:

calculating displacement information on other positions of each sub-region at each level in the first image pyramid based on gray information on the second image pyramid and gray information on the first image pyramid.

Preferably, subsequent to the step of performing densification processing based on the final displacement value and other positions in the corresponding sub-region to obtain displacement information on each level in the first image pyramid, the method further comprises the steps of:

optimizing the displacement information on each level in the first image pyramid by substituting the displacement information on each level in the first image pyramid into an optical flow constraint equation having a total variation term and an illumination function term in a form of L1 norm.

In a second aspect, the present disclosure provides an apparatus for calculating stress parameters, comprising:

an image pyramid establishment module, configured to establish a first image pyramid according to an image of a sample before deformation, and establish a second image pyramid corresponding to the first image pyramid according to an image of the sample after deformation;

a displacement information calculation module, configured to start from displacement information on a top level in the first image pyramid, iteratively calculate displacement information on each level in the first image pyramid relative to a corresponding level in the second image pyramid based on a center point of each sub-region at each level in the first image pyramid and other positions in the sub-region;

a strain information calculation module, configured to calculate strain information on the sample according to displacement information on a bottom level of the first image pyramid; and a stress parameter calculation module, configured to calculate stress parameters of the sample based on the strain information.

In a third aspect, the present disclosure also provides a system for calculating stress parameters, comprising:

a load applying apparatus, configured to apply a load to a sample to deform the sample;

an image collection device, configured to collect an image of the sample before deformation and an image of the sample after deformation; and an apparatus for calculating stress parameters connected with the image collection device, configured to receive the image of the sample before deformation and the image of the sample after deformation collected by the image collection device, and calculate stress parameters of the sample according to the image of the sample before deformation and the image of the sample after deformation by using the method for calculating stress parameters as described above.

In a fourth aspect, the present disclosure provides a computer device, comprising: a memory, a processor, and computer instructions stored in the memory and executable by the processor, the processor implements the method for calculating stress parameters provided in above technical solutions when executing the computer instructions.

In the method, apparatus and system for calculating stress parameters and the computer device in the present disclosure using the above-mentioned technical solutions, calculation of displacement information on each level in the first image pyramid based on displacements of the center point and other positions of each sub-region of that level can improve the accuracy of calculation of displacement information; and the calculation efficiency can be optimized by establishing image pyramids, thereby balancing the efficiency and accuracy of the stress parameter calculation.

In order to make the above and other objectives, features, and advantages of the present disclosure more obvious and understandable, embodiments in conjunction with the accompanying drawings are described in detail below.

BRIEF DESCRIPTION OF DRAWINGS

In order to more clearly describe the technical solutions in the embodiments of the present disclosure or the prior art, the drawings that need to be used in the description of the embodiments or the prior art are briefly introduced. Obviously, the drawings in the description below are merely some of the embodiments herein, those skilled in the art can also obtain other drawings based on these drawings without creative efforts.

ILLUSTRATION OF REFERENCE SIGNS 10. apparatus for calculating stress parameters;
20. load applying apparatus;
30. image collection device;
51. image pyramid establishment module;
52. displacement information calculation module;
53. strain information calculation module;
54. stress parameter calculation module;
702. computer device;
704. processor;

706. memory;
708. drive mechanism;
710. input/output module;
712. input device;
714. output device;
716. presentation device;
718. graphical user interface;
720. network interface;
722. communication link; and
724. communication bus.

DESCRIPTION OF EMBODIMENTS

The technical solutions in the embodiments of the present disclosure are described clearly and completely in conjunction with the accompanying drawings in the embodiments of the present disclosure. Obviously, the described embodiments are only a part of the embodiments of the present disclosure, other than all of the embodiments of the present disclosure. Based on the embodiments in the present disclosure, all the other embodiments obtained by those skilled in the art without creative effort shall fall within the protection scope of the present disclosure.

It should be noted that the terms "first" and "second" in the specification, claims and the above-mentioned drawings herein are used to distinguish similar objects, and not necessarily used to describe a specific sequential or chronological order. It should be understood that the data used in this way can be interchanged under appropriate circumstances, so that the embodiments described herein can be implemented in a sequence other than those illustrated or described herein. In addition, the terms "comprising" and "having" and any variations thereof are intended to encompass non-exclusive inclusions. For example, a procedure, method, apparatus, product, or device that include a series of steps or units that are clearly listed are not necessarily limited to those steps or units, but may also include other steps or units that are not clearly listed or that are inherent to the procedure, method, product, or apparatus.

The existing methods of measuring with strain gauges and calculating the critical failure pressure of the measured object have obvious defects. Digital image correlation (DIC) method, also known as digital speckle correlation method, is an image measurement method applying a computer vision technology, the principle of which is to acquire deformation information on a region of interest through correlation calculations in two images of a test piece before and after deformation. Specifically, a region of interest in the image before deformation is meshed, and each sub-region thereof is regarded as a rigid motion. Then for each sub-region, the correlation calculations are carried out according to a predefined correlation function in some search method, and a region having a maximum correlation coefficient with a sub-region, i.e., the position of said sub-region after deformation, is found in the image after deformation, and then a displacement of said sub-region can be obtained. The calculation for all the sub-regions are performed, and the deformation information throughout the full field can be finally obtained. This method has extremely loose requirements for experimental environment and has advantages of full-field measurement, strong anti-interference ability, and high measurement accuracy.

However, the DIC method requires a lot of calculations for obtaining the deformation information, which has an impact on the calculation processing efficiency. Therefore, when the DIC method is adopted for deformation field measurement, a high image resolution and dense data points are essential conditions for obtaining high-quality test results, which, however, significantly increases the processing time of the DIC method.

Figure 1:
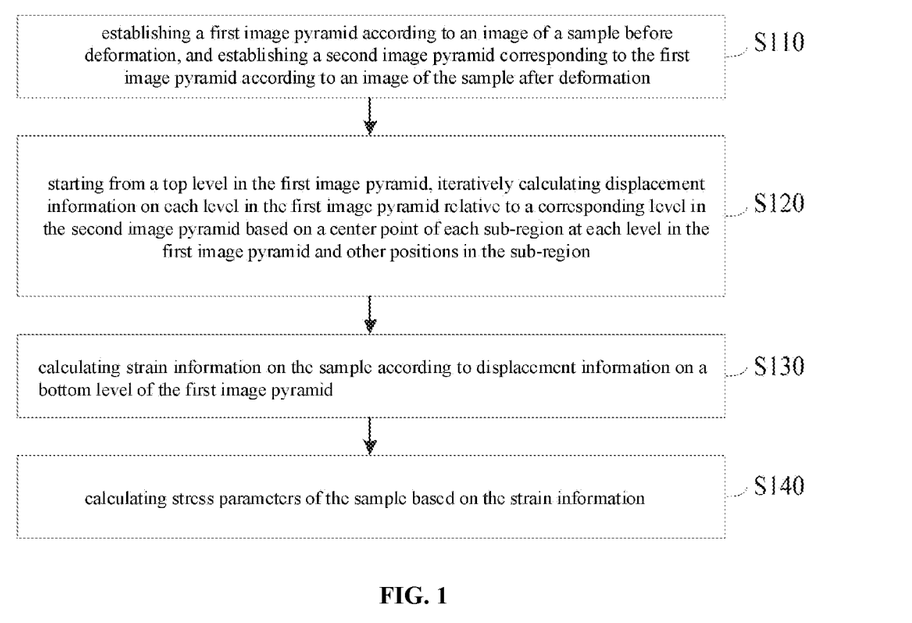
FIG. 1 is a schematic diagram illustrating steps of a method for calculating material stress parameters provided in an embodiment of the present disclosure.

In view of this, in order to improve the processing efficiency of the DIC method while guaranteeing the quality of the test results, the embodiments of this disclosure provide a method, apparatus, system, device and storage medium for calculating material stress parameters. FIG. 1 is a schematic diagram illustrating steps of a method for calculating material stress parameters provided in an embodiment of the present disclosure. This disclosure provides method and operation steps as described in the embodiments or flowcharts. However, more or fewer operation steps can be included based on conventional or non-creative efforts. The sequence of steps listed in the embodiments is only one of the execution sequences for several steps, and does not represent the unique execution sequence. During the actual execution, the system or apparatus product can be executed sequentially or in parallel according to the method shown in the embodiments or the drawings. Specifically, as shown in FIG. 1, the method can comprise the steps of:

S110: establishing a first image pyramid according to an image of a sample before deformation, and establishing a second image pyramid corresponding to the first image pyramid according to an image of the sample after deformation.

Figure 2:
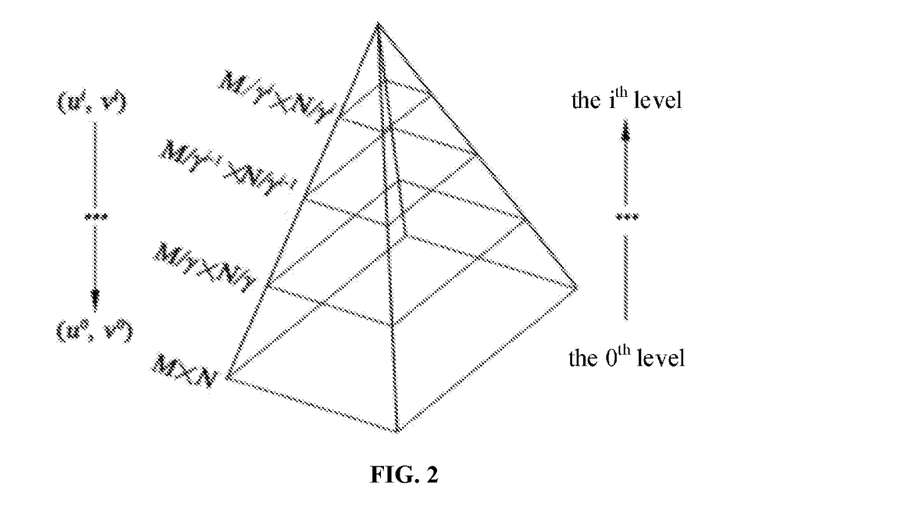
FIG. 2 is a schematic diagram illustrating an establishment of an image pyramid.

FIG. 2 is a schematic diagram illustrating an establishment of an image pyramid. A bottom level, i.e., a $0^{th}$ level, of an image pyramid is the acquired original image (the image of the sample before deformation or the image of the sample after deformation). A size parameter of the original image is recorded as M pixels×N pixels (M can be equal or unequal to N). The original image is scaled-down with a preset scale factor γ, and a picture with a size of (M/γ) pixels×(N/γ) pixels is generated and stored as a first level image; then the same scaling-down process is performed again based on the first level image to generate a second level image; and subsequently, the scaling-down process is continuously repeated to obtain images of different sizes at each level until the information contained in the $i^{th}$ level image is small enough to meet a small displacement limitation of an optical flow constraint equation. A picture calculation frame structure finally formed after the above steps is shaped like a "pyramid" structure, therefore, the image set finally obtained is referred to as an "image pyramid", and the process of obtaining an image pyramid is referred to as establishment of an image pyramid.

It should be noted that, in the process of gradually scaling down the picture, gray information recorded in a single pixel on a last level (closer to a top of the pyramid) is obtained by gray-scale averaging several pixels on a next level (closer to a bottom of the pyramid), therefore, details of texture features on each level in the image are constantly roughened, which is a "from fine to coarse" process, i.e., in a direction as indicated by an arrow on a right side of FIG. 2.

S120: starting from a top level in the first image pyramid, iteratively calculating displacement information on each level in the first image pyramid relative to a corresponding level in the second image pyramid based on a center point of each sub-region at each level in the first image pyramid and other positions in the sub-region.

That is, starting from the top level (i.e., the $i^{th}$ level image) in the first image pyramid, the displacement information (generally a displacement solution in a matrix form) on the top level obtained is enlarged according to the preset scale factor γ, and a numerical value of the displacement solution at the top level is also enlarged according to the scale factor γ; then the numerical value is substituted into calculation of the displacement information on the next level (i.e., a $(i-1)^{th}$ level), and then displacement information on a $(i-2)^{th}$ level is calculated based on the displacement information on the $(i-1)^{th}$ level; and this process is repeated until the displacement information on the original picture level (i.e., the $0^{th}$ level) is obtained. It can be seen that the calculation of the displacement information on each level in the first image pyramid is a "from coarse to fine" process, i.e., in a direction as indicated by an arrow on a left side in FIG. 2.

It should be noted that other positions in each sub-region here refer to positions other than the center point of the sub-region, i.e., the displacement information on each level in the first image pyramid not only depends on the displacement information on the center point of each sub-region in each level, but also depends on the displacement information on positions, other than the center point, of each sub-region in each level. Therefore, the accuracy of calculation of the displacement information on each level can be improved.

S130: calculating strain information on the sample according to displacement information on a bottom level of the first image pyramid; and S140: calculating stress parameters of the sample based on the strain information.

The method for calculating stress parameters provided in an embodiment of this disclosure can improve the accuracy of the displacement information calculation based on the displacement information on the center point as well as other positions of each sub-region at each level in the first image pyramid; and by a way of establishing the image pyramid, when the displacement information on the first several levels of the image pyramid is calculated, not too much calculation time is consumed since the number of sub-regions is small; while when the displacement information on the next several levels (especially the bottom of the original image) is calculated, since the calculation of the first several levels has obtained sufficiently accurate displacement information for being iteratively used as an initial value in the displacement information calculation of a next level, an algorithm iteration process can be carried out in a "neighborhood" that is in the vicinity of the initial displacement value in the calculation of the next several levels. The calculation is greatly reduced, thereby optimizing the calculation efficiency. In summary, the method provided in the embodiment of this disclosure takes into account and balances both the calculation efficiency and the calculation accuracy.

In an embodiment of this disclosure, S120: prior to the step of starting from a top level in the first image pyramid, iteratively calculating displacement information on each level in the first image pyramid relative to a corresponding level in the second image pyramid based on a center point of each sub-region at each level in the first image pyramid and other positions in the sub-region, the method comprises the steps of:

dividing each level in the first image pyramid into sub-regions, the top level of the first image pyramid being one sub-region; and setting a size parameter of the sub-region to be greater than or equal to a size of the top level in the first image pyramid; and a number of sub-regions corresponding to each level increasing according to a hierarchical relationship; i.e., except for the top level in the first image pyramid, there are more than one sub-regions divided for other levels.

When dividing the sub-regions, the divided sub-regions should traverse the entire image in the level. Preferably, for all levels other than the top level in the first image pyramid, two adjacent sub-regions are overlapped with each other. The size of the overlapped portion can be adjusted based on the size parameter of the sub-region, so as to increase the denseness of division of the sub-regions, thereby increasing the spatial denseness of the displacement information on each level and improving the calculation accuracy of the displacement information.

Figure 3:
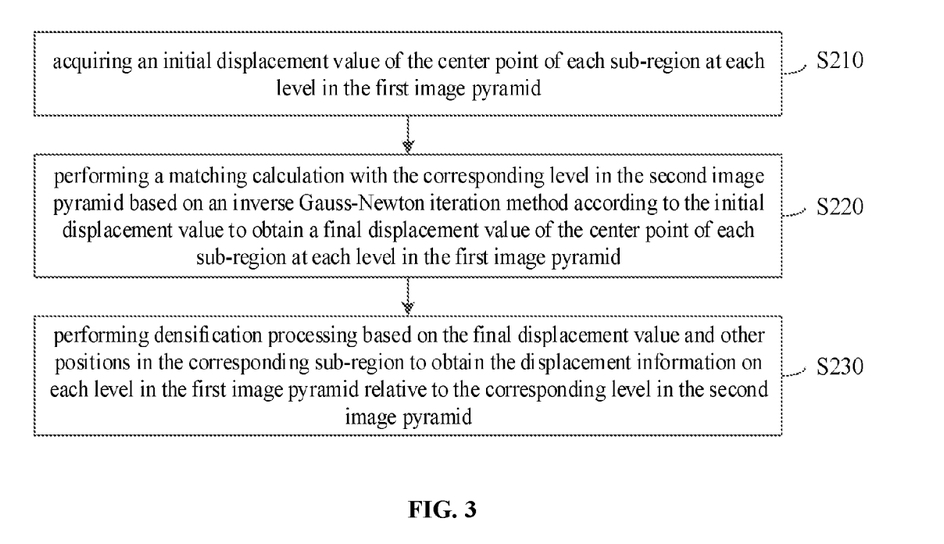
FIG. 3 is a schematic diagram illustrating steps of calculating displacement information on each level in the first image pyramid in an embodiment of the present disclosure.

In an embodiment of this disclosure, as shown in FIG. 3, the step of S120: starting from a top level in the first image pyramid, iteratively calculating displacement information on each level in the first image pyramid relative to a corresponding level in the second image pyramid based on a center point of each sub-region at each level in the first image pyramid and other positions in the sub-region comprises the steps of:

S210: acquiring an initial displacement value of the center point of each sub-region at each level in the first image pyramid;

S220: performing a matching calculation with the corresponding level in the second image pyramid based on an inverse Gauss-Newton iteration method according to the initial displacement value to obtain a final displacement value of the center point of each sub-region at each level in the first image pyramid; and S230: performing densification processing based on the final displacement value and other positions in the corresponding sub-region to obtain the displacement information on each level in the first image pyramid relative to the corresponding level in the second image pyramid.

The method for calculating stress parameters provided in an embodiment of this disclosure combines a Lucas-Kanade method (including sub-region division and acquisition of an initial displacement value) with a reversely combined Gauss-Newton iterative algorithm to achieve a local DIC. Since a model of the Lucas-Kanade method is simple, there is no need to calculate complicated shape functions and correlation coefficients; meanwhile, the reversely combined Gauss-Newton iterative algorithm greatly simplifies calculation of image gradients and can accurately calculate displacement information on each level in the first image pyramid relative to the corresponding level in the second image pyramid, and balances the efficiency and accuracy of calculation, such that the complicated displacement and deformation measurement of materials take one step towards real-time applications. Further, each image sub-region not only includes the final displacement value of the center point, but also includes displacement of other positions through the densification processing, which finally makes the displacement information on each level in the first image pyramid more dense and closer to the continuous displacement field.

Further, the step of S210: acquiring an initial displacement value of the center point of each sub-region at each level in the first image pyramid, further comprises:

presetting displacement information on the sub-region at the top level in the first image pyramid; and calculating an initial displacement value of a center point of each sub-region at a next level in the first image pyramid based on the hierarchical relationship, according to the displacement information on a last level in the first image pyramid $$u_{i,0} = u_{i+1}(x_c/\gamma) \cdot \gamma \quad (1)$$

where $u_{i,0}$ is the initial displacement value of the $i^{th}$ level sub-region, and a subscript 0 represents the initial value; $u_{i+1}$ is the displacement information on the $(i+1)^{th}$ level; $x_c$ is a coordinate of the center point of the $i^{th}$ level sub-region; and $\gamma$ is the scale factor between levels.

That is, the initial displacement value of each sub-region at the next level (i.e., a local parameter) is iteratively calculated from the displacement information on the last level (i.e., a global parameter). In an embodiment of this disclosure, the initial displacement value of the sub-region at the top level in the first image pyramid is preset to zero, so as to obtain the displacement information on the top level.

Further, S220: performing a matching calculation with the corresponding level in the second image pyramid based on an inverse Gauss-Newton iteration method according to the initial displacement value to obtain a final displacement value of the center point of each sub-region at each level in the first image pyramid. Specifically, the following method steps can be adopted:

calculating a gray gradient matrix of an image before deformation (i.e., the bottom level of the first image pyramid). Specifically, a simple finite forward difference method can be adopted, and after that, the grayscale gradient matrix of the image at each level in the first image pyramid can be used as a search template without change, and the time consumed in iteratively calculating the grayscale gradient of image at each level can be greatly reduced;

acquiring a Jacobian matrix of a shape function with respect to parameter coefficients; wherein the shape function can be used to predict the deformation of the second image pyramid relative to the first image pyramid, the shape function is generally a polynomial with unknown coefficients describing the displacement, and the parameter coefficients are the unknown coefficients of the polynomial;

calculating the steepest descent image matrix of sub-regions at each level in the first image pyramid to be matched according to the gray gradient matrix and the shape function;

substituting the preset or pre-obtained initial displacement values ($u_0$, $v_0$) into the shape function to obtain pixel coordinates of the sub-regions corresponding to the corresponding level of the initial second image pyramid, and then obtaining a residual image subset matrix by using a gray-level interpolation method based on these coordinates and the second image pyramid;

calculating the iterative value of the displacement or the parameter coefficient by using the steepest descent image matrix and the residual image subset matrix;

superimposing the iterative value calculated in the above step with the initial displacement value to obtain a value and substituting the value as a new initial displacement value into the displacement shape function; and repeating the iteration process until the iteration value meets the preset requirements, for example, the Euclidean norm of the displacement iteration value is less than the minimum value:

$$|\Delta p|_2 = \sqrt{(\Delta u)^2 + (\Delta v)^2} < \varepsilon = 1 \tag{2}$$

where $\|\Delta p\|_2$ represents a L2 norm of an iterative value $\Delta p$, i.e., an Euclidean norm; $\Delta u$ represents a vector element in an x direction; $\Delta v$ represents a vector element in a y direction; and $\varepsilon$ represents a minimum value much less than 1.

In this disclosure, S230: prior to the step of performing densification processing based on the final displacement value and other positions in the corresponding sub-region to obtain displacement information on each level in the first image pyramid, the method further comprises the steps of:

calculating an Euclidean norm (i.e., calculating the displacement iteration value: $\|u_i - u_{i,0}\|_2$) of the initial displacement value and the final displacement value;

comparing the Euclidean norm with a size parameter of the sub-region; and performing densification processing based on the final displacement value and other positions in the corresponding sub-region when the Euclidean norm is greater than the size parameter of the sub-region to guarantee the stability and reliability of the displacement calculation while guaranteeing the calculation accuracy.

Further, in this disclosure, the step of performing densification processing based on the final displacement value and other positions in the corresponding sub-region when the Euclidean norm is greater than the size parameter of the sub-region can comprise the steps of:

calculating the displacement information on other positions of each sub-region at each level in the first image pyramid based on gray information on the second image pyramid and gray information on the first image pyramid.

Specifically, a Formula (3) can be used for densification processing:

$$u_i(x) = \sum_s \frac{\chi_{s,x}}{\max\{1, \|I_s(t+1) - I_s(t)\|_2\}} \cdot \sum_s \frac{\chi_{s,x}}{\max\{1, \|I_s(t+1) - I_s(t)\|_2\}} \cdot u_{is} \tag{3}$$

Where $u_i(x)$ is a displacement at x within the level sub-region s of the first image pyramid; $X_{s,x}$ is a coverage index of the sub-region, if the sub-region s involves coverage at the position x, then $X_{s,x}=1$, if the sub-region s involves no coverage at the position x, then $X_{s,x}=I_s(t)$ represents a gray distribution of the sub-region s before the sample is deformed (i.e., the first image pyramid), $I_s(t+1)$ represents a gray distribution of the sub-region s after the sample is deformed (i.e., the second image pyramid); and is $u_{is}$ a displacement of the sub-region s (the final displacement value of the center point).

When the image sub-regions at each level are divided, in an embodiment of this disclosure, an overlap between adjacent sub-regions is preferably formed (there may be two sub-regions overlapping each other, or there may be more than two sub-regions overlapping each other), the displacements of other positions in the sub-regions are obtained according to the final displacement values of the center points in the overlapping sub-regions, so that the image sub-regions not only include the final displacement values of the center points, and finally, the displacement information on each level in the first image pyramid becomes more dense and close to the continuous displacement field.

Preferably, in this disclosure, subsequent to the step of performing densification processing based on the final displacement value and other positions in the corresponding sub-region to obtain displacement information on each level in the first image pyramid, the method further comprises the steps of:

substituting the displacement information on each level in the first image pyramid into an optical flow constraint equation having a total variation term and an illumination function term in a form of L1 norm, and optimizing the displacement information on each level in the first image pyramid.

That is substituted into a Formula (4):

$$\inf_{u_i,v_i,w_i} \int_\Omega |\nabla u_i| + |\nabla v_i| + \qquad (4)$$

$$\lambda \cdot \left| \frac{\partial I_i'}{\partial x}(u_i - \gamma \cdot u_{i+1}) + \frac{\partial I_i'}{\partial y}(v_i - \gamma \cdot v_{i+1}) + \frac{\partial I_i'}{\partial t} + \beta \cdot w_i \right| d\Omega \text{ s.t. } I_i' =$$

$$I_i(x + \gamma \cdot u_{i+1}, y + \gamma \cdot u_{i+1}, t + 1)$$

where inf is an optimal solution, $\Omega$ is a definition domain of finite real numbers; $u_i$ is a displacement at the $i^{th}$ level in an x direction; $v_i$ is a displacement at the $i^{th}$ level in a y direction, $|\Box u_i| + |\Box v_i|$ is a total variation term in a form of L1 norm; $\lambda$ is a weight coefficient of a displacement calculation term $$\left| \frac{\partial I_i'}{\partial x}(u_i - \gamma \cdot u_{i+1}) + \frac{\partial I_i'}{\partial y}(v_i - \gamma \cdot v_{i+1}) + \frac{\partial I_i'}{\partial t} + \beta \cdot w_i \right|; I_i$$

is a gray level of the $i^{th}$ level image, $\gamma$ is a scale factor between levels; $w_i$ is an illumination function term and is used to characterize brightness and contrast changes of the image, and $\beta$ is a weight coefficient of the illumination function term.

The above-mentioned improved optical flow constraint equation uses a full variation term in the form of L1 norm in place of the "regularized" penalty term in the form of L2 norm in the original optical flow constraint equation, so that the calculation of displacement information in discontinuous displacement field and large displacement field can be applied; and an addition of the illumination function item is beneficial to improve the accuracy of the displacement information on each level. In an embodiment of this disclosure, the displacement information on each level is optimized based on the above-mentioned improved optical flow constraint equation, so that the same applicability and accuracy are available, and thus more accurate results are obtained when the strain information and stress parameters are calculated based on the displacement information on the bottom level of the first image pyramid.

In an embodiment of this disclosure, the step of S130: calculating strain information on the sample according to displacement information on a bottom level of the first image pyramid can comprise the following method steps.

Green-Lagrange strain tensor is defined as:

$$F = \frac{\partial x}{\partial X} \qquad (5)$$

$$E = \frac{1}{2} \cdot (F^T \cdot F - I)$$

where x is a position after deformation, X is a position before deformation; E is a material strain tensor; F is a deformation gradient; I is an identity matrix.

A Formula (5) is rewritten as:

$$F^p = \frac{1}{S_\Omega} \int_{\partial \Omega} x \otimes v ds \qquad (6)$$

where $F^p$ is a plane deformation gradient, $S_\Omega$ is an area of the selected region, x is a displacement vector, v is a normal direction vector of an outer contour; and S is an area contour.

Figure 4:
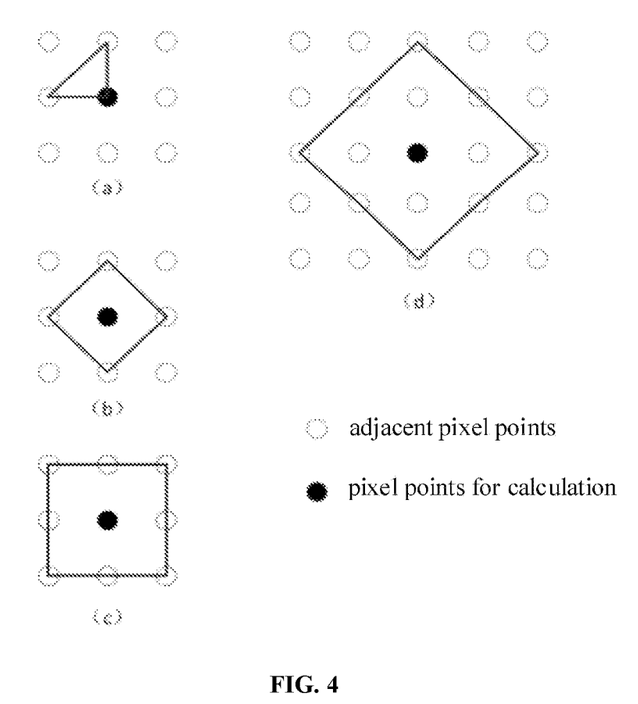
FIG. 4 is a schematic diagram illustrating the selected subset according to an embodiment of the present disclosure.

During calculation in a Formula (6), the pixel points in some regions of the bottom level image of the first image pyramid can be selected as a subset. The shape of the subset can be determined based on the specific image shape. Generally, triangles, diamonds and squares are selected. FIG. 4 is a schematic diagram illustrating several selected subsets, in which a number of pixels involved in the calculation can also be increased or decreased according to particular conditions.

The plane deformation gradient of the pixel points in the subset is calculated after the shape of the subset is set, then the Formula (6) can be further rewritten as:

$$F^p = \frac{1}{2S_\Omega} \sum_{n=1}^{N} [x^n + x^{n+1}] \otimes v^n dl^n \qquad (7)$$

where N represents a number of contour points in the subset; $v^n$ represents an outer normal direction vector of a corresponding line segment; and $l^n$ represents a unit length of the corresponding line segment; $x^n$ represents a position of an $n^{th}$ pixel after deformation in the x-direction; $x^{n+1}$ represents a position of an $(n+1)^{th}$ pixel after deformation in the x-direction.

The Formulae (6) and (7) only give the plane deformation gradient formulae in the x-direction. The plane deformation gradient formula in the y-direction is available with reference to the Formulae (6) and (7) and is not given again herein.

In fact, $v^n dl^n$ is a constant on the determined contour. Assuming that a counterclockwise direction around the contour is positive, a calculation formula for $v^n dl^n$ can be obtained as follows:

$$[v^n dl^n] = \begin{vmatrix} Y^{n+1} - Y^n \\ -X^{n+1} + X^n \end{vmatrix} \qquad (8)$$

where $Y^{n+1}$ represents a position of the $(n+1)^{th}$ pixel before deformation in the y-direction; $Y^n$ represents a position of the $n^{th}$ pixel before deformation in the y-direction; $X^{n+1}$ represents a position of the $(n+1)^{th}$ pixel before deformation in the x-direction; and $X^n$ represents a position of the $n^{th}$ pixel before deformation in the x-direction.

Substitution of the Formula (8) into the Formula (7) can obtain:

$$\begin{bmatrix} F_{XX} & F_{XY} \\ F_{YX} & F_{YY} \end{bmatrix} = \begin{cases} F_{XX} = \frac{1}{2S_\Omega} \sum_{n=1}^{N} (x^n + x^{n+1})(Y^{n+1} - Y^n) \\ F_{XY} = \frac{1}{2S_\Omega} \sum_{n=1}^{N} -(x^n + x^{n+1})(X^{n+1} - X^n) \\ F_{YX} = \frac{1}{2S_\Omega} \sum_{n=1}^{N} (y^n + y^{n+1})(Y^{n+1} - Y^n) \\ F_{YY} = \frac{1}{2S_\Omega} \sum_{n=1}^{N} -(y^n + y^{n+1})(X^{n+1} - X^n) \end{cases} \qquad (9)$$

where F is the deformation gradient (a two-dimensional tensor with four components in a two-dimensional plane); xx represents an x component in the x-direction; xy represents a y component in the x-direction; yx represents an x component in the y-direction; and yy represents a y component in the y-direction.

Herein, a relevant subset area $S_\Omega$ can be solved according to the following Formula:

$$S_\Omega = \frac{1}{2}\sum_{n=1}^{N}\begin{vmatrix} X^n & X^{n+1} \\ Y^n & Y^{n+1} \end{vmatrix} \quad (10)$$

Meanwhile, after a deformation gradient [F] is obtained, a linearized strain tensor can be directly obtained as:

$$\varepsilon_\Omega = \frac{1}{2}\left(\langle F\rangle_\Omega^T + \langle F\rangle_\Omega\right) - I \quad (11)$$

In this case, the linearized strain tensor of a subset is obtained (generally speaking, this strain tensor can be used as a strain tensor at the center of the subset). This step is repeated to divide the full field image into subsets for calculation, thus the strain information of pixels in the full field can be obtained. Therefore, the method for calculating stress parameters provided in the embodiments of this disclosure directly obtains the strain information according to the displacement information on the bottom level of the first image pyramid, instead of obtaining the strain data in a conventional approximate method, so the calculation of strain information is more accurate.

In an embodiment of the present disclosure, the step of S140: calculating stress parameters of the sample based on the strain information can comprise:

After the displacement information and strain information on the bottom level of the first image pyramid are obtained, the relevant parameters can be solved directly according to the definition of the mechanical parameters to be solved (such as Young's modulus and Poisson's ratio).

For example, the Young's modulus of the sample can be solved according to the definition of Young's modulus, i.e., a Formula (12)

$$E = \frac{\sigma}{\varepsilon_{yy}} \quad (12)$$

where $\sigma$ is stress (i.e., the stress loaded on the sample), and can be obtained according to the load applying apparatus; $\varepsilon_{yy}$ is a yy component of a full-field strain $\varepsilon$, and can be calculated based on $F_n$ in the above strain information.

For another example, a Poisson's ratio of the sample can be solved according to the definition of Poisson's ratio, i.e., a Formula (13)

$$v = \frac{\varepsilon_{xx}}{\varepsilon_{yy}} \quad (13)$$

where $\varepsilon_{xx}$ is an xx component of the full-field strain $\varepsilon$. The parameters in the Formula (13) can be calculated based on $F_{xx}$ in the strain information of Young's modulus.

To sum up, in the embodiments of this disclosure, the sub-region is divided by using the Lucas-Kanade method, the initial displacement value is acquired, and the sub-region matching problem is solved by using the reversely combined Gauss-Newton iterative algorithm; the displacement information is optimized further through the densification processing of displacement field and the optical flow constraint equation with the total variation term and the illumination function term in the form of L1 norm, such that the displacement information on each level in the first image pyramid can be more accurately calculated, and the efficiency of calculation can be guaranteed while the accuracy of the calculation result is guaranteed. Furthermore, the displacement information is solved based on the definition formula of strain tensor and the definition formula of stress parameters, so that the stress parameters finally obtained become more accurate.

Figure 5:
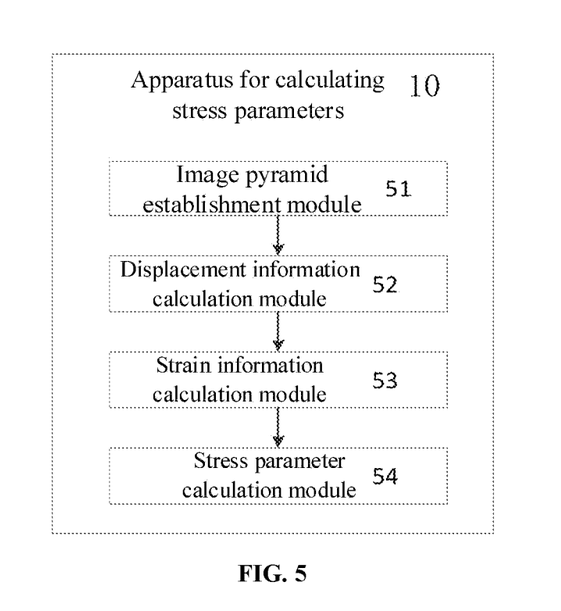
FIG. 5 is a schematic diagram illustrating an arrangement of an apparatus for calculating material stress parameters provided in an embodiment of the present disclosure.

As shown in FIG. 5, based on the same inventive concept, an embodiment of this disclosure also provides an apparatus for calculating stress parameters 10, comprising:

an image pyramid establishment module 51 configured to establish a first image pyramid according to an image of a sample before deformation, and establish a second image pyramid corresponding to the first image pyramid according to an image of the sample after deformation;

a displacement information calculation module 52 configured to start from displacement information on a top level in the first image pyramid, iteratively calculate displacement information on each level in the first image pyramid relative to a corresponding level in the second image pyramid based on a center point of each sub-region at each level in the first image pyramid and other positions in the sub-region;

a strain information calculation module 53 configured to calculate strain information on the sample according to displacement information on a bottom level of the first image pyramid; and a stress parameter calculation module 54 configured to calculate stress parameters of the sample based on the strain information.

The advantageous effects obtained by the device provided in the embodiment of this disclosure are consistent with those obtained in the above-mentioned method, and will not be repeated here.

Figure 6:
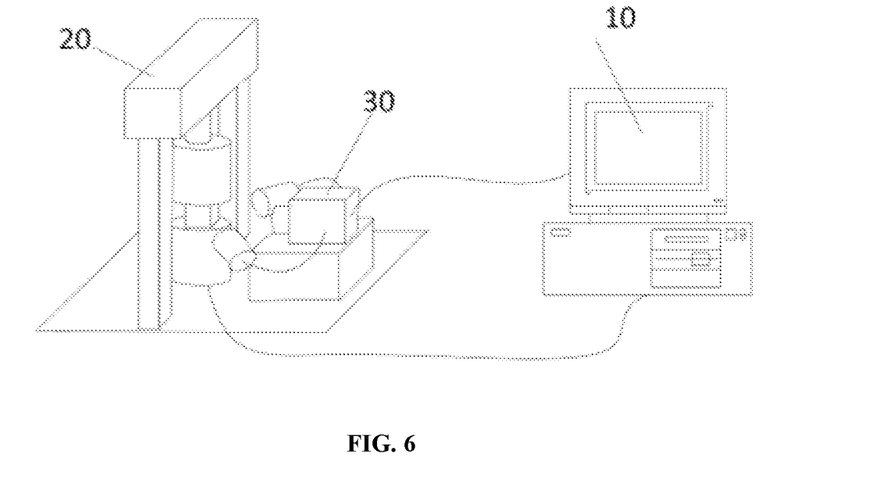
FIG. 6 is a schematic diagram illustrating an arrangement of a system for calculating material stress parameters provided in an embodiment of the present disclosure.

As shown in FIG. 6, an embodiment of this disclosure also provides a system for calculating stress parameters, comprising:

a load applying apparatus 20 configured to apply loads to a sample to deform the sample;

an image collection device 30 configured to collect an image of the sample before deformation and an image of the sample after deformation; and the apparatus for calculating stress parameters 10 connected to the load applying apparatus 20 and the image collection device 30, configured to receive load data applied by the load applying apparatus 20 to the sample and image information collected by the image collection device 30, and calculate stress parameters of the sample according to the load data and the image information.

The image collection device 30 may be a CCD camera and a telecentric lens, and the image collection device 30 can acquire images of the sample deformed under different loads (i.e., different loads the load applying apparatus 20 applies to the sample), and thereby calculating the stress parameters of the sample under different loads and different deformation variables.

The advantageous effects obtained by the apparatus provided in the embodiments of this disclosure are consistent with those obtained in the above-mentioned method, and will not be repeated here.

Figure 7:
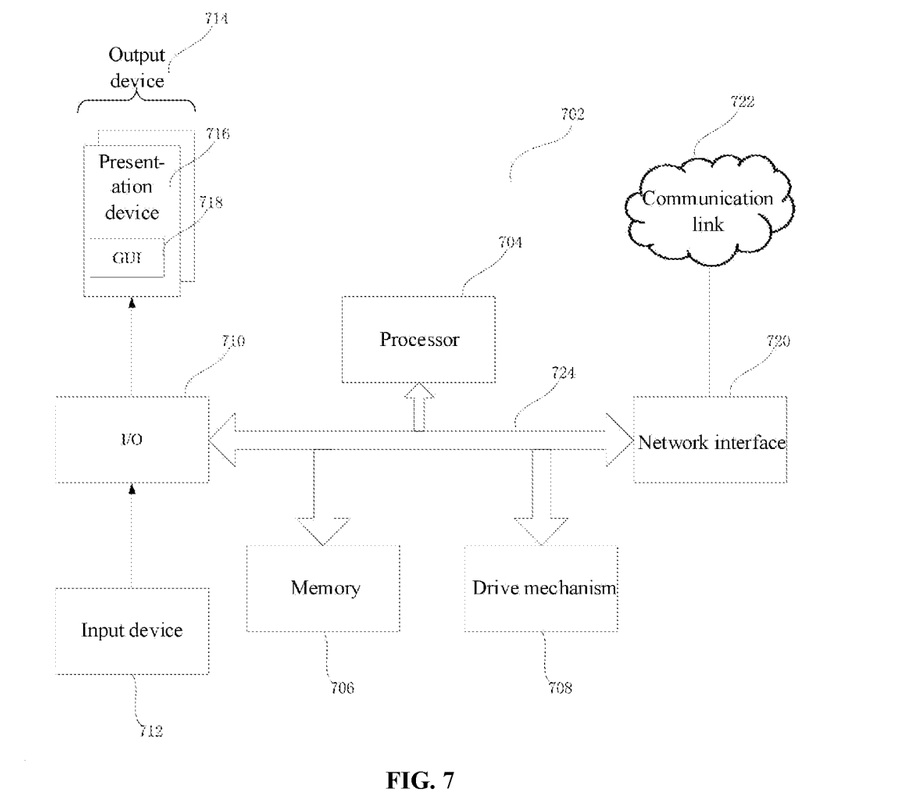
FIG. 7 is a schematic diagram illustrating an arrangement of a computer device provided in an embodiment of the present disclosure.

As shown in FIG. 7, a computer device is provided in an embodiment herein. The computer device 702 can comprise one or more processors 704, such as one or more central processing units (CPUs), each of which can implement one or more hardware threads. The computer device 702 can also comprise any memory 706 configured to store any type of information such as codes, settings, data, or the like, not limited, e.g., the memory 706 can comprise any one or a combination of: any type of RAM, any type of ROM, a flash memory device, a hard disk, an optical disk, or the like. More generally, any memory can use any technology to store information. Further, any memory can provide volatile or non-volatile retention of information. Further, any memory can represent a stationary or removable component of the computer device 702. In one case, when the processor 704 executes an associated instruction stored in any memory or combination of memories, the computer device 702 can perform any operation of the associated instruction. The computer device 702 also comprises one or more drive mechanisms 708 for interacting with any memory, such as a hard disk drive mechanism, an optical disk drive mechanism, or the like.

The computer device 702 can also comprise: an input/output module 710 (I/O) for receiving a plurality of inputs ((via an input device 712) and for providing a plurality of outputs (via an output device 714)). A specific output mechanism can comprise: a presentation device 716 and an associated graphical user interface 718 (GUI). In other embodiments, the input/output module 710 (I/O), the input device 712, and the output device 714 cannot be included, and the computer device 702 can only be used as a computer device in the network. The computer device 702 can also comprise one or more network interfaces 720 for exchanging data with other devices via one or more communication links 722. One or more communication buses 724 couple the components described above together.

The communication links 722 can be implemented in any manner, for example, via a local area network, a wide area network (e.g., the Internet), a point-to-point connection, or any combination thereof. The communication links 722 can comprise any combination of hardwired links, wireless links, routers, gateway functions, name servers governed by any protocol or combination of protocols.

Corresponding to the method in FIGS. 1 and 3, an embodiment of the present disclosure also provides a computer-readable storage medium with a computer program stored thereon, which executes the steps of the method when run by a processor.

An embodiment herein also provides a computer-readable instruction, wherein when the processor executes the instruction, the program therein allows the processor to implement the method shown in FIGS. 1 and 3.

It should be understood that in the plurality of embodiments herein, the sequence numbers of the above-mentioned processes does not mean an order of execution. The execution order of the processes should be determined by functions and internal logic, and should not constitute any limitation to the implementation in the embodiments herein.

It should also be understood that, in the embodiments herein, the term "and/or" is merely an association relationship describing associated objects, and means that there can be three relationships. For example, A and/or B can mean that A exists alone, A and B exist simultaneously, and B exists alone. In addition, the character "/" herein generally indicates that the associated objects are in an "or" relationship.

Those skilled in the art can appreciate that the units and algorithm steps of the examples described in the embodiments disclosed herein can be implemented by an electronic hardware, a computer software, or a combination thereof. In order to clearly illustrate the interchangeability of hardware and software, the composition and steps of each example have been generally described in accordance with the functions in the above description. Whether these functions are executed by hardware or software depends on specific applications and design constraint conditions of the technical solution. Those skilled in the art can adopt different methods for each specific application to implement the described functions, but this implementation should not be considered beyond the scope of the present disclosure.

Those skilled in the art can clearly understand that, for the convenience and conciseness of description, the corresponding processes in the foregoing method embodiment can be referred to for the specific operation process of the system, apparatus, and unit, which will not be repeated here.

In the plurality of embodiments provided herein, it should be understood that the disclosed system, apparatus, and method can be implemented in other manners. For example, the apparatus embodiment described above is only illustrative. For example, a division of the units is only a division of logical functions, and there can be other divisions in an actual implementation. For example, a plurality of units or components can be combined or integrated into another system, or some features can be ignored or not implemented. In addition, the displayed or discussed mutual coupling or direct coupling or communication connection can be indirect coupling or communication connection through some interfaces, apparatus or units, and can also be connected in electrical, mechanical or other forms.

The units described as separate components can or cannot be physically separated, and the components displayed as units can or cannot be physical units, that is, the components can be located in one place, or distributed over a plurality of network units. Some or all of the units can be selected according to actual needs to achieve the objectives of the solutions of the embodiments herein.

In addition, the functional units in the plurality of embodiments herein can be integrated into one processing unit, or each unit can physically exist alone, or two or more units can be integrated into one unit. The integrated units can be implemented in the form of hardware or software functional units.

If implemented in the form of the software functional unit and sold or used as an independent product, the integrated units can be stored in a computer-readable storage medium. Based on this understanding, the technical solution herein is essentially a part that makes contribution to the prior art, or all or part of the technical solution can be embodied in the form of software product, and the computer software product is stored in a storage medium, including a plurality of instructions to enable a computer device (which can be a personal computer, a server, or a network device) to execute all or part of the steps of the method described in many embodiments of the present disclosure. The aforementioned storage media include media that can store program codes, such as a U disk, a mobile hard disk, a read-only memory (ROM, Read-Only Memory), a random access memory (RAM, Random Access Memory), a magnetic disk or an optical disk.

Specific embodiments are used herein to illustrate the principles and implementation of the present disclosure. Descriptions of the embodiments are only used to help understand the method and core ideas of the present disclosure. For those skilled in the art, there exist changes in the specific implementation and the scope of application according to the ideas of the present disclosure. Summed up, the disclosure contained in this specification should not be construed as limitations to the present disclosure.

The invention claimed is:

1. A method for calculating stress parameters, comprising:
    establishing a first image pyramid according to an image of a sample before deformation, and establishing a second image pyramid corresponding to the first image pyramid according to an image of the sample after deformation;
    dividing each level in the first image pyramid into one or more sub-regions, a top level in the first image pyramid being one sub-region, and a number of sub-regions corresponding to each level increasing according to a hierarchical relationship;
    starting from the top level in the first image pyramid, iteratively calculating displacement information on each level in the first image pyramid relative to a corresponding level in the second image pyramid based on a center point of each sub-region at each level in the first image pyramid and other positions in the respective sub-region;
    calculating strain information on the sample according to displacement information on a bottom level of the first image pyramid; and
    calculating stress parameters of the sample based on the strain information;
    wherein the step of iteratively calculating the displacement information on each level in the first image pyramid relative to the corresponding level in the second image pyramid based on the center point of each sub-region at each level in the first image pyramid and other positions in the respective sub-region comprises the steps of:
        acquiring an initial displacement value of the center point of each sub-region at each level in the first image pyramid;
        performing a matching calculation with the corresponding level in the second image pyramid based on an inverse Gauss-Newton iteration method according to the initial displacement value of each sub-region, to obtain a final displacement value of the center point of each sub-region at each level in the first image pyramid; and
        performing densification processing based on the final displacement value of each sub-region and other positions in the respective sub-region, to obtain the displacement information on each level in the first image pyramid relative to the corresponding level in the second image pyramid;
    wherein prior to the step of performing densification processing based on the final displacement value of each sub-region and other positions in the respective sub-region, the method further comprises the steps of:
        calculating a Euclidean norm of the initial displacement value of each sub-region and the final displacement value of each the respective sub-region;
        comparing the Euclidean norm of each sub-region with a size parameter of the respective sub-region; and
        performing the densification processing based on the final displacement value of each sub-region and other positions in the respective sub-region when the Euclidean norm of the respective sub-region is greater than the size parameter of the respective sub-region.

2. The method according to claim 1, wherein the step of acquiring an initial displacement value of the center point of each sub-region at each level in the first image pyramid further comprises the steps of:
    presetting displacement information on the one sub-region at the top level in the first image pyramid; and
    calculating an initial displacement value of a center point of each sub-region at a next level in the first image pyramid based on the hierarchical relationship, according to the displacement information on the bottom level in the first image pyramid.

3. The method according to claim 1, further comprises the step of:
    calculating displacement information on other positions of each sub-region at each level in the first image pyramid based on gray information on the second image pyramid and gray information on the first image pyramid.

4. The method according to claim 1, wherein subsequent to the step of performing densification processing based on the final displacement value of each sub-region and other positions in the respective sub-region, to obtain displacement information on each level in the first image pyramid, the method further comprises the step of:
    optimizing the displacement information on each level in the first image pyramid by substituting the displacement information on each level in the first image pyramid into an optical flow constraint equation having a total variation term and an illumination function term in a form of L1 norm.

5. A system for calculating stress parameters, comprising:
    a load applying apparatus, configured to apply a load to a sample to deform the sample;
    a camera, configured to collect an image of the sample before deformation and an image of the sample after deformation; and
    a processor for calculating stress parameters that is connected with the camera, configured to receive the image of the sample before deformation and the image of the sample after deformation collected by the camera, and calculate stress parameters of the sample according to the image of the sample before deformation and the image of the sample after deformation by using the method for calculating stress parameters according to claim 1.

6. A computer device, comprising: a memory, a processor, and computer instructions stored in the memory and executable by the processor, wherein when executing the computer instructions, the processor implements a method for calculating stress parameters comprising the steps of:
    establishing a first image pyramid according to an image of a sample before deformation, and establishing a second image pyramid corresponding to the first image pyramid according to an image of the sample after deformation;
    dividing each level in the first image pyramid into one or more sub-regions, a top level in the first image pyramid being one sub-region, and a number of sub-regions corresponding to each level increasing according to a hierarchical relationship;
    starting from the top level in the first image pyramid, iteratively calculating displacement information on each level in the first image pyramid relative to a corresponding level in the second image pyramid based on a center point of each sub-region at each level in the first image pyramid and other positions in the sub-region;
    calculating strain information on the sample according to displacement information on a bottom level of the first image pyramid; and calculating stress parameters of the sample based on the strain information;

wherein the step of iteratively calculating the displacement information on each level in the first image pyramid relative to the corresponding level in the second image pyramid based on the center point of each sub-region at each level in the first image pyramid and other positions in the respective sub-region comprises the steps of:

acquiring an initial displacement value of the center point of each sub-region at each level in the first image pyramid;

performing a matching calculation with the corresponding level in the second image pyramid based on an inverse Gauss-Newton iteration method according to the initial displacement value of each sub-region, to obtain a final displacement value of the center point of each sub-region at each level in the first image pyramid; and performing densification processing based on the final displacement value of each sub-region and other positions in the respective sub-region, to obtain the displacement information on each level in the first image pyramid relative to the corresponding level in the second image pyramid;

wherein prior to the step of performing densification processing based on the final displacement value of each sub-region and other positions in the respective sub-region, the method further comprises the steps of:

calculating an Euclidean norm of the initial displacement value of each sub-region and the final displacement value of the respective sub-region;

comparing the Euclidean norm of each sub-region with a size parameter of the respective sub-region; and performing the densification processing based on the final displacement value of each sub-region and other positions in the respective sub-region when the Euclidean norm of the respective sub-region is greater than the size parameter of the respective sub-region.

7. The computer device according to claim 6, wherein when executing the computer instructions, the processor further implements the following steps:

presetting displacement information on the one sub-region at the top level in the first image pyramid; and calculating an initial displacement value of a center point of each sub-region at a next level in the first image pyramid based on the hierarchical relationship, according to the displacement information on the bottom level in the first image pyramid.

8. The computer device according to claim 6, wherein when executing the computer instructions, the processor further implements the following step: calculating displacement information on other positions of each sub-region at each level in the first image pyramid based on gray information on the second image pyramid and gray information on the first image pyramid.

9. The computer device according to claim 6, wherein when executing the computer instructions, the processor further implements the following step: subsequent to the step of performing densification processing based on the final displacement value of each sub-region and other positions in the respective sub-region, to obtain displacement information on each level in the first image pyramid, optimizing the displacement information on each level in the first image pyramid by substituting the displacement information on each level in the first image pyramid into an optical flow constraint equation having a total variation term and an illumination function term in a form of L1 norm.

* * * * *